United States Patent [19]

Nakazawa et al.

[11] Patent Number: 5,583,959
[45] Date of Patent: Dec. 10, 1996

[54] OPTICAL PULSE COMPRESSION DEVICE

[75] Inventors: Masataka Nakazawa; Eiji Yoshida, both of Mito, Japan

[73] Assignee: Nippon Telegraph and Telephone Corporation, Tokyo, Japan

[21] Appl. No.: 450,533

[22] Filed: May 25, 1995

[30] Foreign Application Priority Data

May 27, 1994 [JP] Japan .................................. 6-115662

[51] Int. Cl.$^6$ ................................ G02B 6/26; H01S 3/30; H01S 3/00
[52] U.S. Cl. ................................ 385/27; 385/31; 385/39; 385/42; 385/123; 372/6; 359/341; 359/345
[58] Field of Search ................................ 385/15, 24, 31, 385/27, 28, 38, 123, 122; 372/6; 359/333, 340, 341, 343, 345

[56] References Cited

U.S. PATENT DOCUMENTS

| | | | |
|---|---|---|---|
| 4,635,263 | 1/1987 | Mollenauer | 372/3 |
| 5,008,887 | 4/1991 | Kafka et al. | 372/6 |
| 5,191,628 | 3/1993 | Byron | 385/27 |
| 5,218,608 | 6/1993 | Aoki | 372/6 |
| 5,239,607 | 8/1993 | de Silva et al. | 385/122 |
| 5,400,165 | 3/1995 | Gnauck et al. | 372/6 X |
| 5,477,555 | 12/1995 | Debeau et al. | 372/6 X |

FOREIGN PATENT DOCUMENTS

| | | | |
|---|---|---|---|
| 0473331 | 3/1992 | European Pat. Off. | 385/27 X |
| 2-230222 | 9/1990 | Japan | 385/27 X |
| 4-192386 | 7/1992 | Japan | 385/27 X |
| 5-37296 | 6/1993 | Japan | 385/27 X |
| 5-37295 | 6/1993 | Japan | 385/27 X |

OTHER PUBLICATIONS

"Compensation of Soliton Broadening in Nonlinear Optical Fibers with Loss" K. Tajima, Optics Letters 12(1):54–56 (1987).

"Generation of a 170fs, 10GHz Optical Pulse Train at 1.5μm", M. Nakazawa et al., Extended Abstracts for the 42nd Spring Meeting, 1995 of the Japan Society of Applied Physics and Related Societies, pp. 992, 29a–ZQ–8, (1995).

"Generation of 170fs, 10GHz Transform–Limited Pulse Train at 1.55μm Using a Dispersion–Decreasing, Erbium–Doped Active Soliton Compressor", M. Nakazawa et al., Electronics Letters, 30(24):2038–2040 (1994).

"Femtosecond Erbium–Doped Optical Fiber Amplifier", M. Nakazawa et al., Applied Physics Letters, 57(13):653–655 (1990).

"Femtosecond Optical Pulse Generation Using A Distributed–Feedback Laser Diode", M. Nakazawa et al., Electronics Letters, 26(24):2038–2040 (1990).

S. V. Chernikov et al., "Soliton pulse compression in dispersion–decreasing fiber", Optics Letters, vol. 18, No. 7, Apr. 1, 1993 pp. 476–478.

S. V. Chernikov et al., "Experimental demonstration of step–like dispersion profiling in optical fibre for soliton pulse generation and compression", Electonics Letters, vol. 30, No. 5, Mar. 1994, pp. 433–435.

Patent Abstracts of Japan, vol. 012, No. 025, Jan. 26, 1988.
Patent Abstracts of Japan, vol. 011, No. 366, Nov. 28, 1987.

*Primary Examiner*—Brian Healy
*Attorney, Agent, or Firm*—Finnegan, Henderson, Farabow, Garrett & Dunner, L.L.P.

[57] ABSTRACT

A pulse compression device is disclosed for generating ultra short pulses in the femtosecond range In the device an input soliton is subjected to pulse width compression by propagation in a rare-earth doped optical fiber having a gradually diminishing group velocity dispersion from an input end to an output end. The pulse compression is produced by the diminishing dispersion value of the optical fiber as well as by adiabatic narrowing generated by a pumping light coupled, through an optical coupler, to the optical fiber by increasing the energy of the input soliton propagating in the optical fiber. By adjusting the light power of the pumping light, the pulse width of the soliton can be freely controlled.

2 Claims, 3 Drawing Sheets

OPTICAL PULSE COMPRESSION DEVICE

BACKGROUND OF THE INVENTION

1. Field of the Invention

The present invention relates to an optical pulse compression device for generating ultra-short pulses necessary to realize ultra-fast optical communication technology.

2. Background Art

A conventional optical pulse compression device comprises, for example, a light source for generating an optical pulse; a rare-earth doped fiber amplifier for increasing the peak power of a pulse generated by the light source; an optical pulse compression fiber for compressing the width of the output pulse outputted from the optical fiber amplifier. This optical pulse compression fiber has a feature in that the group velocity dispersion within the optical fiber is anomalous and the absolute value of the dispersion decreases from the input end towards the output end in the direction of the light propagation.

Before explaining the operation of the optical pulse compression device, it is necessary to explain what an optical soliton is which performs an important role in producing compression of the pulse width.

An optical soliton is a stable optical pulse generated as a result of a balance between the pulse width widening caused by an anomalous dispersion effect in the optical fiber on the one hand, and pulse width compression caused by a self-phase modulation effect, on the other hand. The characteristic feature is that the soliton pulse is propagated in the optical fiber without altering its waveform. The peak power required to generate a fundamental soliton of the first order, $N=1$, is given by the following formula:

$$P_{N=1} = 0.776(\lambda^3/(\pi^2 c n_2)) \cdot (|D|/\tau^2) \cdot p\omega^2 \qquad (1)$$

In Equation (1), D stands for a dispersion in the optical fiber at wavelength $\lambda$, c is the speed of light, $n_2$ is a non-linear refractive index of the optical fiber, $\tau$ is a pulse width, and $\omega$ is a spot size of the optical fiber.

The group velocity dispersion refers to a frequency-dependent amount of change in the group velocity, and to produce an optical soliton, the sign of the group velocity dispersion must be anomalous.

The operation of the optical pulse compression device will be explained next.

An optical pulse generated by a light source propagates through the rare-earth doped fiber amplifier (shortened to fiber amplifier hereinbelow) and is launched into the optical pulse compression fiber (shortened to pulse compression fiber herein below).

While propagating through the fiber amplifier, the energy of the optical pulse is increased within the optical fiber, which leads to an increase in the peak power of the optical pulse. When the peak power of the optical pulse which passed through the fiber amplifier satisfies Equation (1) at the input end of the pulse compression fiber, a fundamental soliton of $N=1$ is produced.

As described above, the absolute value of the group velocity dispersion in the pulse compression fiber becomes gradually smaller from the input end to the output end in the direction of the pulse propagation. While propagating in such a pulse compression fiber, the optical soliton maintains a constant energy by decreasing the pulse width. In other words, in accordance with Equation (1), the energy E ($=\tau \cdot P_{N=1}$) of an optical soliton is proportional to $|D|/\tau$, therefore, if the energy does not change, the pulse width inevitably becomes narrower when the value of $|D|$ becomes smaller.

It follows that as the optical soliton propagates in the pulse compression fiber, the pulse width gradually becomes narrow. Further, because the group velocity dispersion at the output end of the pulse compression fiber is anomalous and if its value is close to 0, the pulse width of the optical soliton at the output end is significantly narrower than that of the optical soliton at the input end (termed "input soliton" hereinbelow).

Therefore, by using a pulse compression fiber having an anomalous group velocity dispersion in which the absolute value of dispersion becomes gradually smaller from the input end to the output end in the direction of the light propagation, it is possible to compress the pulse width of the input soliton in keeping with the nature of the optical soliton.

Further, as can be seen from Equation (1), a product of energy and pulse width ($E \cdot \tau$) is a constant in the fundamental soliton ($N=1$). Therefore, if the fundamental soliton is adiabatically amplified in the propagation direction, its energy increases in proportion to the degree of amplification (optical gain) while maintaining the above relationship, thus causing the pulse width to decrease inversely with the optical gain. This phenomenon is called the adiabatic narrowing by optical soliton amplification.

There are methods, other than the use of a pulse compression an fiber presented above, for compressing optical soliton. An example is a method based on adiabatic narrowing of an optical soliton using rare-earth doped optical fiber having a constant group velocity dispersion. In this case, the amount of the adiabatic narrowing is dependent on the power of the pumping light source; thus the pulse width of the compressed pulses can be controlled by adjusting the pump power.

However, in the conventional devices for optical pulse compression presented above, there is a limit to the narrowing of the pulse width achievable by these compression techniques. That is, in the method utilizing the reduction in the group velocity dispersion in the optical fiber, although the pulse width does become narrower as the optical soliton propagates in a pulse compression fiber, it is insufficient to generate ultra-short pulses in the femtosecond-range ($10^{-15}$ second:fs).

One reason is that a propagation loss is suffered by the optical soliton while it is propagating through the optical fiber. When the optical intensity is attenuated due to the propagation loss, the pulse waveform broadens and interferes with the pulse compression. Thus, one of the problems in the conventional optical pulse compression devices is the broadening of the optical pulses due to the propagation loss.

Similarly, although the adiabatic narrowing of the optical soliton is able to reduce the pulse width, because the conventional device is based on a rare-earth doped optical fiber having a constant dispersion, compression of the optical soliton is mediocre, and it is difficult to generate ultra-short pulses in the femtosecond-range.

SUMMARY OF THE INVENTION

It is an object of the present invention to provide an optical pulse compression device to produce a significant reduction in the pulse width of an input soliton, and to freely control the pulse width of the compressed soliton.

The object is achieved in an optical pulse compression device comprising: a rare-earth doped optical fiber, including a rare-earth element, having an input end and a output end; an pumping light source for generating a pumping light; and an optical coupler for coupling the pumping light to the rare-earth doped optical fiber; wherein the rare-earth doped optical fiber is provided with an anomalous group velocity dispersion and an absolute value of the group velocity dispersion diminishing gradually toward zero, from the input end to the output end in a direction of propagation of the optical pulse, so as to narrow a pulse width of an optical soliton generated at the input end and generate an ultra-short pulse.

According to the optical pulse compression device presented above, the technique based on two optical effects, diminishing the dispersion value and adiabatic narrowing through optical soliton amplification, achieves a significantly higher degree of compression of the input soliton than do the conventional methods.

This is because the peak power of the soliton pulse in the present device is much higher than that in the conventional devices, enabling production of optical solitons having a much narrower pulse width.

Therefore, the present device generates optical pulses in the femtosecond range, and regulates the pulse width of the optical soliton generated by the device by adjusting the power of the pumping light source.

Further, it is possible to generate a train of pulses at a high repetition rate by using a multi-stage optical multiplexing circuit comprising 3-dB directional optical couplers.

Potential applications of the optical pulse compression device include, for example, ultra-high-speed time division spectral sources and ultra-high-speed pulse generation devices.

BRIEF DESCRIPTION OF THE DRAWINGS

FIG. 2A shows input pulses (10 GHz repetition rate, pulse width 3 ps); FIG. 2B shows a rare-earth doped optical fiber; and FIG. 2C shows output pulses (10 GHz repetition rate, pulse width 270 fs)

DETAILED DESCRIPTION OF THE PREFERRED EMBODIMENTS

An embodiment of the present invention will be explained with reference to the drawings.

Figure 1:
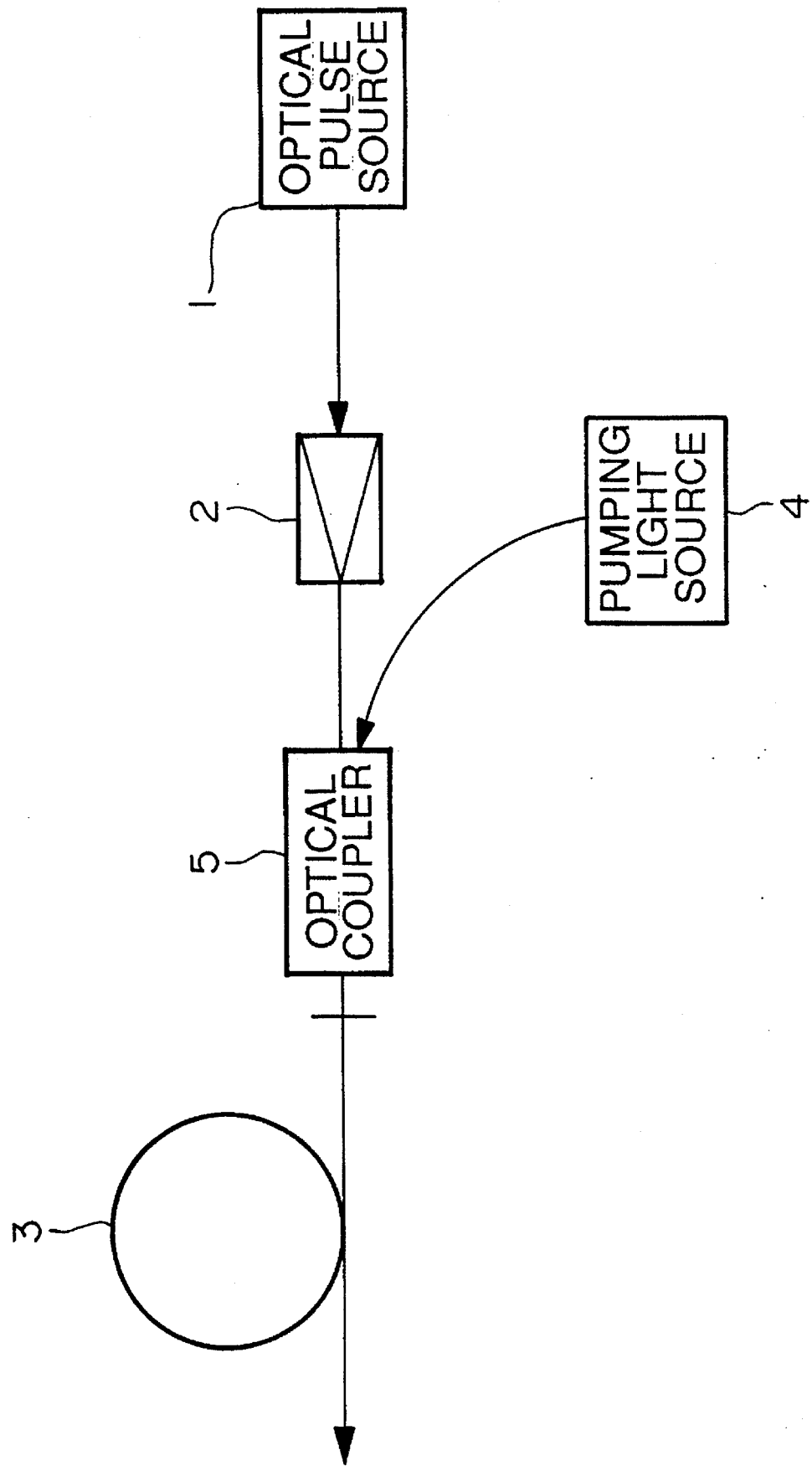
FIG. 1 is a block diagram for an embodiment of the pulse compression device of the present invention.

FIG. 1 shows the construction of an optical pulse compression device of the present invention, having an optical pulse source 1, a rare-earth doped optical fiber amplifier 2, and a rare-earth doped optical fiber 3 (shortened to optical fiber 3 hereinbelow), having an anomalous group velocity dispersion, in which the absolute value of the dispersion diminishes gradually from the input end to the output end along the propagation direction. The device also includes a pumping light source 4 for providing pumping light in the optical fiber 3 and an optical coupler 5 for coupling the pumping light from the pumping light source 4 to the optical fiber 3.

An optical pulse emitting from the optical pulse source 1 is amplified by the fiber amplifier 2 to increase its peak power, and is launched into the optical fiber 3. When the peak power at the input end of the optical fiber 3 becomes equal to the peak power required to generate a fundamental optical soliton (N=1), an optical soliton is produced and propagated in the optical fiber 3.

While the optical soliton is propagating along the optical fiber 3, pulse compression occurs because the dispersion value becomes gradually smaller along the propagation direction.

In effect, gradual diminishing of the dispersion means that the change in the dispersion value, $\delta D$, in the soliton period $z_{sp}$ is fairly small compared with the change in the original dispersion $D$, and the resulting adiabatic change causes the pulse width of the optical soliton to become narrower in proportion to $|D|/\tau$. In other words, from Equation (1) the energy $E$ ($=\tau \cdot P_{N=1}$) of the optical soliton is proportional to $|D|/\tau$, and if the energy is invariant, the pulse width $\tau$ inevitably becomes narrower when $|D|$ becomes smaller. The soliton period $Z_{sp}$ is given by the following equation.

$$Z_{sp}=(0.322\pi^2 c\tau^2)/(\lambda^2 |D|) \qquad (2)$$

On the other hand, if the change $\delta D$ during the soliton period $Z_{sp}$ is larger than the original dispersion $D$, a non-adiabatic change occurs, thus preventing effective pulse compression.

Let us now consider a case of a pulse compression device using a non-doped optical fiber (having no rare-earth doping element) and having the absolute dispersion value becoming gradually smaller in the longitudinal direction of the fiber.

When a soliton of pulse width $\tau_1$ enters such an optical fiber, the output pulse width $\tau_2$ is given by the following expression:

$$\tau_2=\tau_1(1-\delta D/D)/(1-2\alpha L) \text{ tm } (3)$$

where $D$ is the dispersion value at the output end; $\delta D$ is a change in the dispersion value; $\alpha$ is a loss coefficient; and $L$ is the fiber length.

Next, let us consider a case of a pulse compression device using a rare-earth doped optical fiber having a gradually diminishing absolute dispersion value in the longitudinal direction of the fiber. In this case, in addition to a pulse compression produced by the diminishing dispersion, an adiabatic narrowing is produced by optical amplification, and the pulse width $\tau_3$ is narrowed in accordance with the following equation.

$$\tau_3=\tau_1(1-\delta D/D)/(1+2(g-\alpha)L) \qquad (4)$$

where g is an optical gain.

For example, let us examine a case of a non-doped optical fiber of 1 km length, in which the group velocity dispersion changes from the input end at −5 ps/km/nm to −1 ps/km/nm at the output end (the group velocity dispersion is anomalous), and an optical soliton at an wavelength of 1.55 μm, pulse width 3 ps is propagating at a 10 GHz repetition rate.

Assuming a propagation loss of 0.3 dB ($\alpha L=-0.069$) in the optical fiber over 1 km length, the pulse width is $\tau_2=0.7$ ps from Equation (3). In this case, the pulse compression is prevented from occurring by a broadening in the waveform caused by a loss of light intensity while propagating in the optical fiber.

Next, let us examine a case of a doped optical fiber of 1 km length under the same condition, (i.e., the group velocity dispersion is anomalous as the group velocity dispersion changes from the input end at −5 ps/km/nm to −1 ps/km/nm at the output end), and an optical soliton at a wavelength of 1.55 μm, pulse width 3 ps is propagating at 10 GHz repetition rate. In this case, the optical gain in the optical fiber (amplifier) enables not only compensation for the propagation loss but also amplification of the pulse intensity.

Figure 2A:
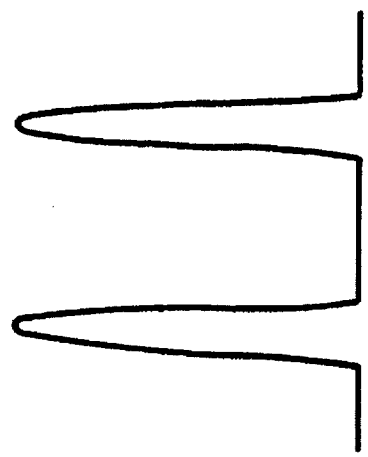
FIGS. 2A to 2C are schematic illustrations to explain an ultra-short pulse generation process.
Figure 2B:
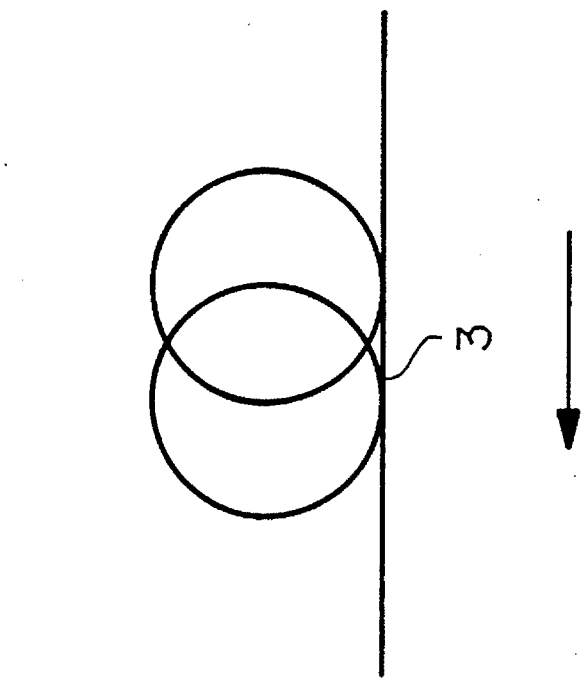
Figure 2C:
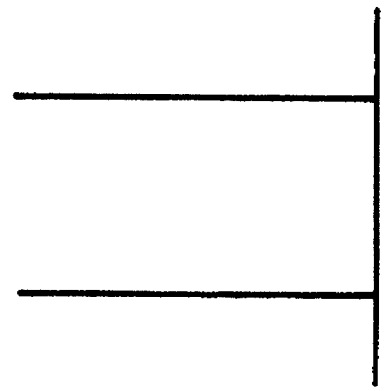

For example, if an erbium (Er)-doped silica fiber is used as the doped optical fiber, it is possible to amplify an optical pulse of 1.55 μm wavelength. In this optical fiber, pulse width is narrowed by the adiabatic narrowing in addition to the pulse compression caused by the diminishing dispersion. Assuming a gain of 3 dB (gL=0.69) over the length of 1 km, the pulse width of the exit pulse is 270 fs in accordance with Equation (4). This is illustrated in FIG. 2.

However, if the optical gain (over the 1 km length) is increased beyond the optimum value demonstrated in this embodiment, higher order solitons are generated, and although the pulse width is further narrowed, a pedestal is produced in the pulse waveform, and it becomes impossible to generate an optical pulse which can be utilized in practice.

This phenomenon is caused by the fact that, because the dispersion diminishes, the peak power of the optical pulse, being subjected to optical amplification, increases beyond the value of the fundamental soliton at N=1 given by Equation (1), and excites higher order solitons of N=2≠3. The peak power $P_N$ required to produce a higher order soliton is given by $P_N=N^2 P_{N=1}$.

As described above, by controlling the optical amplification to within the range for excluding the generation of higher order optical solitons, it becomes possible not only to compensate for the propagation loss but to cause adiabatic compression by optical amplification so that optical pulses of ultra short pulse width can be generated. In other words, the pulse width of the input soliton is compressed to a degree which was not achieved in the conventional methods.

The main feature of the pulse compression device of the present invention is that the input soliton can be compressed beyond any compression values achieved in the conventional compression methods by utilizing the adiabatic narrowing effect in addition to the diminishing dispersion effect.

Furthermore, another feature is that adjustment of the power of the pumping light enables control of the pulse width of the soliton.

Some of the results will be demonstrated in the following examples.

Example 1

The pumping light source operating at a power of 50 mW produces ultra-short pulses of 300 fs pulse width at 10 GHz repetition rate; and at 70 mW, ultra-short pulses of 270 fs pulse width at 10 GHz repetition rate are produced.

Example 2

Optical pulses of a wavelength other than 1.5 μm band can be compressed by selecting the type of optical fiber and the doping element for the rare-earth doped optical fiber. For example, optical pulses of 1.7 μm wavelength can be compressed by using Er-doped optical fiber of fluoride-base in which the group velocity dispersion at 1.7 μm wavelength is anomalous and the absolute value of the group velocity dispersion gradually diminishes towards zero along the optical fiber from the input end to the output end.

Example 3

Similarly, for pulses having wavelengths in the range of 2.7≠2.8 μm, and 3.5 μm band can also be compressed by using the Er-doped fluoride base fibers.

Example 4

For optical pulses having wavelengths in the range of 1.65≠2.05 μm, a thulium (Tm)-doped silica base optical fiber is applicable. For optical pulses having wavelengths in the range of 1.9 μm band and 2.3 μm band, a Tm-doped fluoride base optical fiber is applicable.

In any of the examples given above, it is necessary to use an optical fiber in which the group velocity dispersion at the respective wavelength is anomalous and the absolute value of the group velocity dispersion gradually diminishes toward zero along the optical fiber from the input end to the output end. By using an optical fiber complying with these characteristics, an optical soliton is produced at the input end, and the input soliton produced is highly compressed to generate ultra-short pulses at the output end.

Optical Communication Circuits

Figure 3:
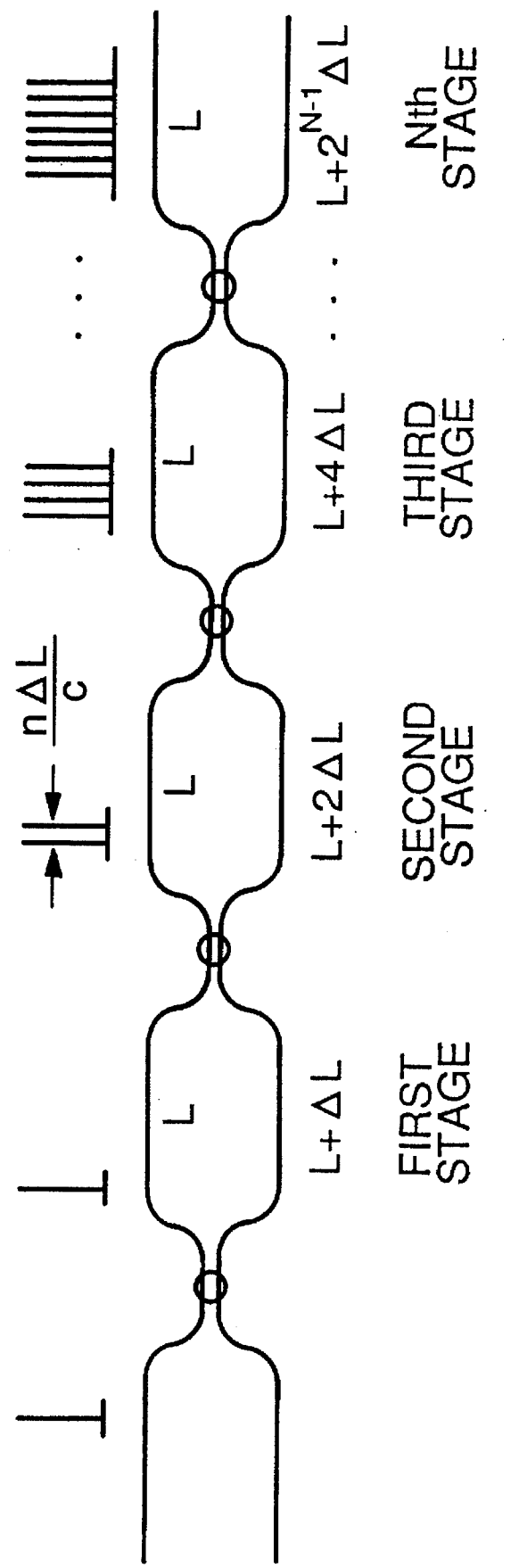
FIG. 3 is a schematic illustration of the structure and the process of multiplexing the ultra-short pulses generated from the pulse compression device of the present invention.

The ultra-short pulses thus generated can be multiplexed with a multi-stage multiplexing circuit based on 3-dB optical directional couplers. For example, for an ultra-short pulse train of 200 fs pulse width operating at a 10 GHz repetition rate, the pulse interval is 100 ps. This interval is large enough to accommodate many additional 200 fs pulses. As shown in FIG. 3, a plurality of 3-dB directional couplers are connected and by adjusting the length of the two end arms suitably, several ultra-short pulse wave trains of 10 GHz≠100 GHz repetition rate can be generated. (Reference: M. Nakazawa, K. Suzuki and Y. Kimura; "20-GHz soliton amplification and transmission with an Er3+-doped fiber", Opt. Lett. 14, pp. 1065–1067 (1989)).

For the 3-dB directional coupler, it is permissible to use any optical devices such as optical fiber couplers, optical waveguides and dielectric multilayer devices. When operating with an input pulse having a period T and 2×2 3-dB optical couplers over N-stages, 2N pulses (where N is a natural number) are generated within the period T. Therefore, by denoting the difference in the arm lengths at both ends by ΔL, the value for ΔL can be chosen to satisfy a formula (nΔL/c)·2N=T, where n is the refraction index and c is the speed of light. These values can be chosen so that, for example, ΔL for the first stage, 2ΔL for the second stage, ... to 2N–1·ΔL for the Nth stage. This configuration is effective in producing a high repetition ultra-short wave train.

The embodiment of the optical pulse compression device was described in terms of practical examples to demonstrate the applicability of the embodiment presented; however, the present invention is in no way limited by the specific details of the examples, and it is obvious that other modifications are possible within the principle of ultra-short pulse generation based on two compression effects, group velocity dispersion and adiabatic narrowing in one optical fiber having a selected doping element.

What is claimed is:

1. An optical pulse compression device comprising:

a rare-earth doped optical fiber;

a pumping light source for generating a pumping light; and an optical coupler for coupling said pumping light to said rare-earth doped optical fiber;

wherein said rare-earth doped optical fiber is provided with an anomalous group velocity dispersion, an absolute value of said group velocity dispersion diminishing gradually toward zero from an input of said rare-earth doped optical fiber to an output of said rare-earth doped optical fiber in a direction of propagation of an optical pulse to adiabatically narrow a pulse width of an optical soliton generated at said input of said rare-earth doped optical fiber and to generate an ultra-short pulse.

2. An optical pulse compression device as claimed in claim 1, wherein a peak optical power in said rare-earth doped optical fiber is less than four times a peak power which generates a fundamental optical soliton in relation to a dispersion value in said rare-earth doped optical fiber and a pulse width of said optical pulse, a level of the peak optical power is controlled by changing a gain in amplification of said rare-earth doped optical fiber.

* * * * *